United States Patent
Jin

(10) Patent No.: US 8,605,898 B2
(45) Date of Patent: Dec. 10, 2013

(54) APPARATUS AND METHOD THAT GENERATES ORIGINALITY VERIFICATION AND VERIFIES ORIGINALITY VERIFICATION

(75) Inventor: Weon Il Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 13/152,139

(22) Filed: Jun. 2, 2011

(65) Prior Publication Data

US 2012/0093310 A1   Apr. 19, 2012

(30) Foreign Application Priority Data

Oct. 15, 2010   (KR) .................... 10-2010-0100661

(51) Int. Cl.
*H04L 29/06* (2006.01)

(52) U.S. Cl.
USPC .............................................. 380/46; 380/44

(58) Field of Classification Search
USPC ............................................... 380/44, 46
See application file for complete search history.

(56) References Cited

U.S. PATENT DOCUMENTS

| | | | |
|---|---|---|---|
| 6,574,455 B2 * | 6/2003 | Jakobsson et al. | 455/411 |
| 2009/0041253 A1 | 2/2009 | Chen et al. | |
| 2010/0290618 A1 * | 11/2010 | Slawomir et al. | 380/44 |

FOREIGN PATENT DOCUMENTS

| | | |
|---|---|---|
| JP | 11-249560 | 9/1999 |
| JP | 2005-217676 | 8/2005 |
| JP | 2009-224997 | 10/2009 |
| KR | 10-2004-0013668 | 2/2004 |
| KR | 10-2005-0037244 | 4/2005 |
| KR | 10-2006-0048485 | 5/2006 |
| KR | 10-2006-0111615 | 10/2006 |
| KR | 10-2008-0104594 | 12/2008 |
| KR | 10-2009-0008162 | 1/2009 |
| KR | 10-2009-0068230 | 6/2009 |
| KR | 10-2010-0018067 | 2/2010 |
| KR | 10-2010-0018792 | 2/2010 |

* cited by examiner

*Primary Examiner* — Brandon Hoffman
*Assistant Examiner* — Thong Truong
(74) *Attorney, Agent, or Firm* — NSIP Law

(57) ABSTRACT

Provided is an apparatus and method that may generate and verify an originality verification (OV). An OV generating apparatus may generate primary information that is based on generator information and a pseudorandom number, may generate at least one secondary information based on the pseudorandom number, may obtain parameters used when the pseudorandom number is generated, may generate the OV including the primary information, the at least one secondary information, and the parameters, and may distribute the OV to an OV request device.

When the OV distributed from the OV request device is received, the OV generating apparatus may regenerate the pseudorandom number based on the parameters included in an OV request message, and may verify the OV included in the verification request message as the OV that is generated by the OV generating apparatus.

22 Claims, 7 Drawing Sheets

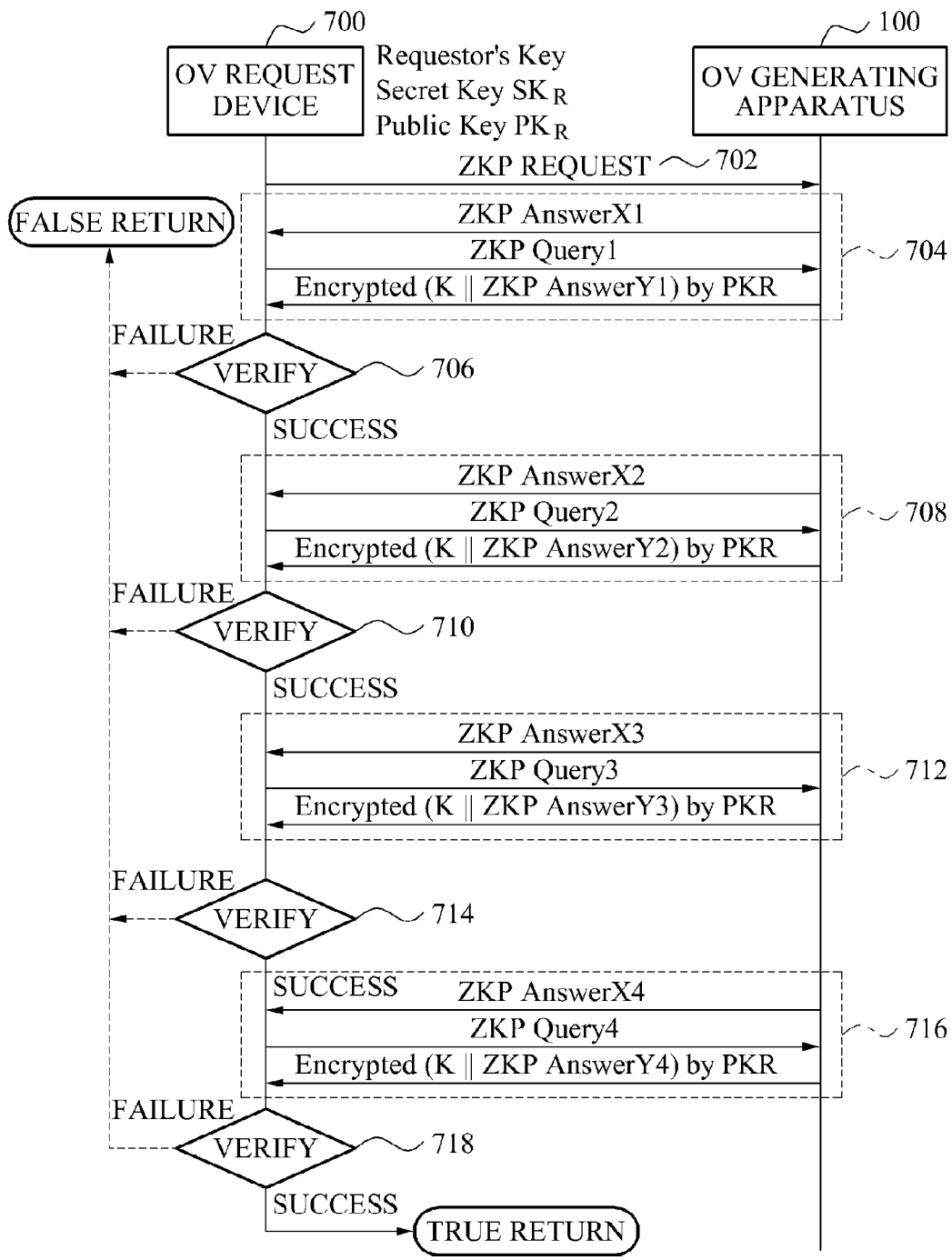

APPARATUS AND METHOD THAT GENERATES ORIGINALITY VERIFICATION AND VERIFIES ORIGINALITY VERIFICATION

CROSS-REFERENCE TO RELATED APPLICATION(S)

This application claims the benefit under 35 U.S.C. §119 (a) of Korean Patent Application No. 10-2010-0100661, filed on Oct. 15, 2010, in the Korean Intellectual Property Office, the entire disclosure of which is incorporated herein by reference for all purposes.

BACKGROUND

1. Field

The following description relates to a pairing between portable terminals, and more particularly, to an originality verification (OV) generating apparatus that generates and distributes an OV and that verifies the distribution of the OV.

2. Description of Related Art

As the demand increases for portable terminals that provide a wireless network service, such as a smart phone, a netbook, a personal digital assistant (PDA), and the like, the amount of services provided via a wireless connection between devices has increased. For example, a hands-free service may be provided via a connection between a mobile phone and a headset, a picture and data transmission service may be provided via a connection between mobile phones, a print service may be provided via a connection between the mobile phone and a printer, and the like.

The importance of secure communication between devices has also increased, such as a secure communication that prevents interception of a text or voice message, and a secure communication that blocks the leak of private information or contents. For example, a BLUETOOTH® scheme may provide the secure communication via a pairing process.

The pairing process may exchange a secret key to provide a secure communication environment, while mobile terminals are connected with each other. Although a pairing scheme enables secure communication between devices, the pairing scheme may not satisfy both convenience and security. In the example of the pairing scheme, when convenience increases, security decreases, and vice versa.

A scheme that may increase both convenience and security using a second channel, such as an infrared light, a wired line, a terminal-contact, and the like, has been provided. However, the scheme using the second channel may be difficult to perform in an environment in which there is a low accessibility between devices.

SUMMARY

In one general aspect, there is provided an apparatus for generating and verifying an originality verification (OV), the apparatus including a primary information generating unit to generate primary information that is included in the OV, using generator information that is associated with a generator of an OV generating apparatus, at least one secondary information generating unit to generate secondary information included in the OV by generating and using a pseudorandom number, a parameter obtaining unit to obtain at least one parameter used when the pseudorandom number is generated, and a combining unit to generate the OV including the primary information, the secondary information, and the at least one parameter.

The generator information may include at least one of identification (ID) information of the OV generating apparatus, address information of the OV generating apparatus, service information of the OV generating apparatus, and pairing history information of the OV generating apparatus.

The primary information generating unit may comprise a hash unit to calculate a hash value by hashing the generator information, a $zero^{th}$ pseudorandom number generating unit to generate a zero pseudorandom number to be used for generating the primary information, an exclusive or (XOR) operation unit to generate basic information by performing an XOR operation using the hash value and the zero-pseudorandom number, and a remainder operation unit to generate the primary information by performing a remainder operation based on a predetermined value using the basic information.

The parameter obtaining unit may obtain a parameter that is used when the zero-pseudorandom number is generated.

The remainder operation unit may generate the primary information by performing a squaring operation using the basic information and by performing a remainder operation based on a predetermined value using the squared basic information.

Each of the at least one secondary information generating unit may comprise a pseudorandom number generating unit to generate a pseudorandom number to be used for generating secondary information, and a remainder operation unit to generate the secondary information by performing a remainder operation based on a predetermined value using the pseudorandom number.

The at least one parameter may be position information associated with the pseudorandom number and seed information.

The remainder operation unit may generate the secondary information by performing a squaring operation using the pseudorandom number and by performing a remainder operation based on a predetermined value using the squared pseudorandom number.

The combining unit may generate the OV by concatenating the primary information, the secondary information, and the at least one parameter.

The apparatus may further comprise a pseudorandom number regenerating unit to regenerate the pseudorandom number using the at least one parameter included in the OV, in response to a verification request message including the OV being received after the OV is distributed, and a verifying unit to verify the OV generating apparatus is the apparatus that generates the OV, using the regenerated pseudorandom number.

The pseudorandom number regenerating unit may regenerate the zero pseudorandom number when a parameter of the zero pseudorandom number exists in the OV, and the verifying unit may verify the OV generating apparatus is the apparatus that generates the OV, using the zero pseudorandom number and the regenerated pseudorandom number.

The verifying unit may verify the OV generating apparatus is the apparatus that generates the OV based on a zero-knowledge proof.

The apparatus may further comprise a pairing unit to connect communication by pairing with an OV request device, to share a secret key while performing the pairing, and to update pairing history information that is associated with the pairing of the OV request device, and a decoder to receive, from the OV request apparatus, encoded basic information, and to decode the encoded basic information based on the secret key, to determine the basic information, wherein the primary information generating unit comprises a basic information receiving unit to receive the basic information, and a remainder operation unit to generate the primary information by performing a remainder operation based on a predetermined value using the basic information.

The basic information may be a hash value that is obtained by hashing one of the updated pairing history information and the generator information.

The at least one secondary information generating unit may be a plurality of a secondary information generating units that generate a plurality of secondary information included in the OV by generating and using a plurality of pseudorandom numbers, respectively, wherein the parameter obtaining unit obtains at least one parameter used when each respective pseudorandom number is generated, and the combining unit generates the OV including the primary information, the plurality of secondary information, and the at least one parameter corresponding to each respective pseudorandom number.

The at least one parameter may be position information associated with each respective pseudorandom number and seed information associated with each respective pseudorandom number.

In another aspect, there is provided a method of generating an originality verification (OV), the method including generating primary information included in the OV, based on generator information that is associated with a generator of an OV generating apparatus, generating at least one secondary information included in the OV, by generating and using a pseudorandom number, obtaining at least one parameter used when the pseudorandom number is generated, and generating the OV including the primary information, the secondary information, and the at least one parameter.

The generating may comprise calculating a hash value by hashing the generator information, generating a zero pseudorandom number to be used for generating the primary information, generating basic information by performing an exclusive or (XOR) operation using the hash value and the zero-pseudorandom number, and generating the primary information by performing a remainder operation based on a predetermined value using the basic information.

The generating of the secondary information may comprise generating at least one pseudorandom number to be used for generating the secondary information, and generating the secondary information by performing a remainder operation based on a predetermined value using the at least one pseudorandom number.

The method may further comprise connecting communication by pairing with an OV request device, sharing a secret key while performing the pairing, and updating pairing history information that is associated with the pairing of the OV request device, and receiving, from the OV request apparatus, encoded basic information, and decoding the encoded basic information to determine the basic information, based on the secret key, wherein the generating of the primary information comprises generating the primary information by performing a remainder operation based on a predetermined value using the basic information.

In another aspect, there is provided a method of verifying a distributed originality verification (OV), the method including receiving a verification request message including the distributed OV, regenerating at least one pseudorandom number based on at least one parameter included in the distributed OV, and verifying an OV generating apparatus is the apparatus that generates the distributed OV, using the at least one pseudorandom number.

The verifying may comprise verifying the OV generating apparatus is the apparatus that generates the distributed OV, based on a zero-knowledge proof.

Other features and aspects may be apparent from the following detailed description, the drawings, and the claims.

BRIEF DESCRIPTION OF THE DRAWINGS

FIG. 7 is a diagram illustrating an example of a zero-knowledge proof process that verifies that an OV generating apparatus is the apparatus that distributes OV.

Figure 1:
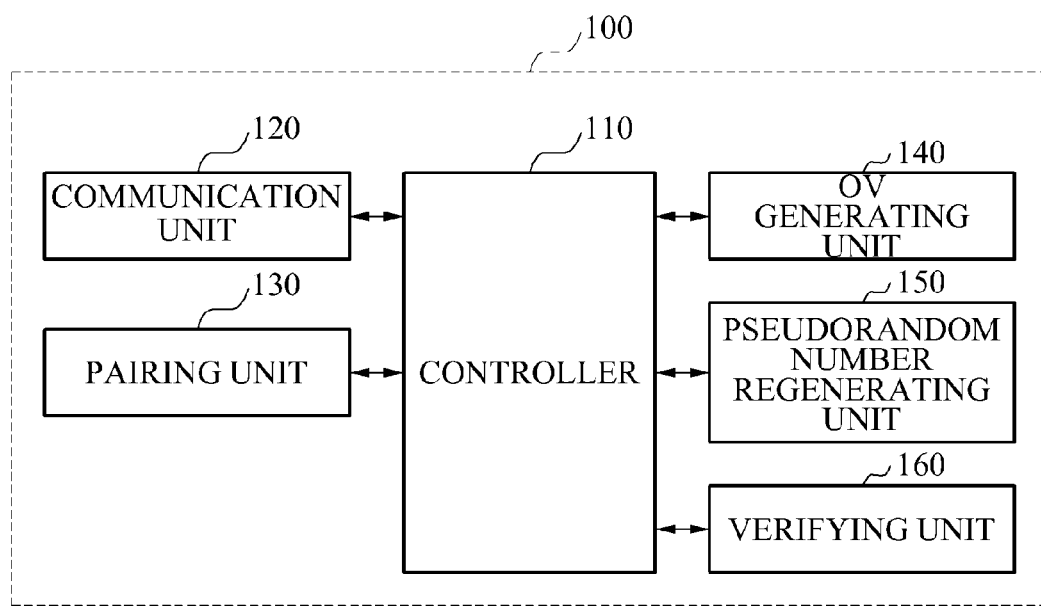
FIG. 1 is a diagram illustrating an example of an originality verification (OV) generating apparatus that generates and verifies an OV.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Various aspects describe an apparatus and method that generates and distributes an originality verification (OV), and verifies the apparatus as an apparatus that generates the OV based on the distributed OV.

FIG. 1 illustrates an example of an originality verification (OV) generating apparatus that generates and verifies an OV.

Referring to FIG. 1, the OV generating apparatus 100 includes a controller 110, a communication unit 120, a pairing unit 130, an OV generating unit 140, a pseudorandom number regenerating unit 150, and verifying unit 160. The OV generating apparatus 100 may be or may be included in a terminal such as a computer, a mobile terminal, a laptop computer, a smart phone, a MP3 player, and the like.

The communication unit 120 may transmit and receive data that is encoded by a secret key that is shared between devices. For example, the communication unit 120 may transmit and receive the encoded data via BLUETOOTH® communication.

The pairing unit 130 may exchange the secret key with a wireless communication target device for a wireless communication connection, via the communication unit 120. The pairing unit 130 may share the secret key during a pairing, and may update pairing history information associated with a pairing of an OV request device.

The OV generating unit 140 may generate primary information that is based on a pseudorandom number and generator information that is associated with a generator of the OV generating apparatus 100. The OV generating unit 140 may generate at least one secondary information based on at least one pseudorandom number. The OV generating unit 140 may obtain a parameter that is used when the pseudorandom numbers are generated. For example, the OV generating unit 140 may generate an OV that includes the primary information, the at least one secondary information, and the parameters. In this example, the generator information may include at least one of identification (ID) information, address information, service information 100, and pairing history information that is associated with the OV generating apparatus 100. An example of the OV generating apparatus 100 is described with reference to FIG. 2.

The pseudorandom number regenerating unit 150 may distribute the OV. In response to a verification request message including the OV being received, the pseudorandom number regenerating unit 150 may regenerate the pseudorandom numbers that are used when the primary information and the secondary information are generated using the parameters that are included in the OV.

Based on the regenerated pseudorandom numbers, the verifying unit 160 may verify that the OV included in the verification request message is generated by the OV generating apparatus 100.

For example, the verifying unit 160 may verify that the OV included in the verification request message is the OV that is generated by the OV generating apparatus 100, based on a zero-knowledge proof. An example of a zero-knowledge proof is described with reference to FIG. 7.

The controller 110 may control the general operations of the OV generating apparatus 100. Although FIG. 1 separately illustrates the controller 110, the pairing unit 130, the OV generating unit 140, the pseudorandom number regenerating unit 150, and the verifying unit 160, the controller 110 may perform functions of one or more of the pairing unit 130, the OV generating unit 140, the pseudorandom number regenerating unit 150, and/or the verifying unit 160.

For example, the controller 110 may include at least one processor configured to perform the functions of one or more of the pairing unit 130, the OV generating unit 140, the pseudorandom number regenerating unit 150, and the verifying unit 160. As another example, the controller 110 may include at least one processor configured to perform a portion of the functions of one or more of the pairing unit 130, the OV generating unit 140, the pseudorandom number regenerating unit 150, and the verifying unit 160.

Figure 2:
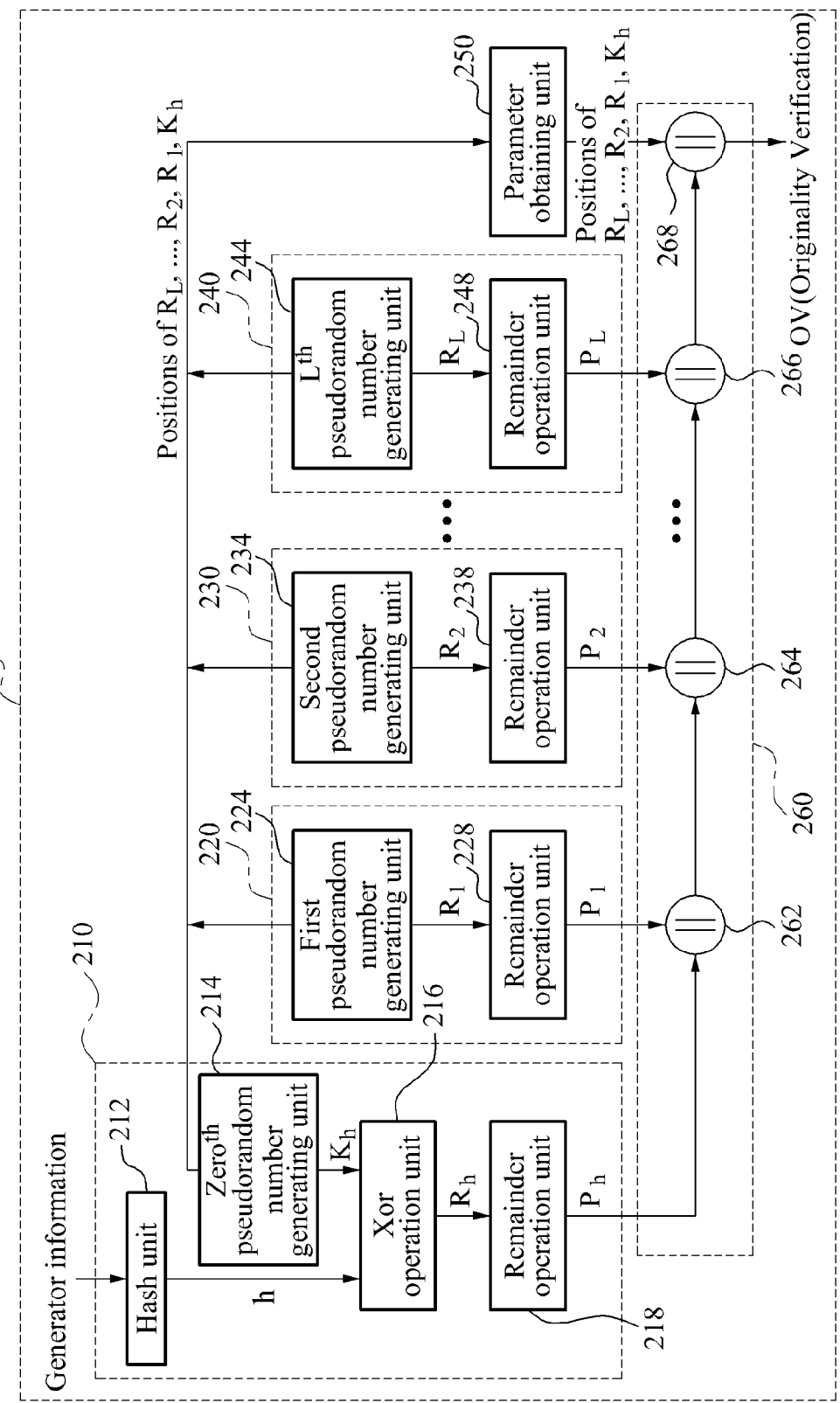
FIG. 2 is a diagram illustrating an example of the OV generating unit of FIG. 1.

FIG. 2 illustrates an example of the OV generating unit of FIG. 1.

Referring to FIG. 2, OV generating unit 140 includes a primary information generating unit 210, a first secondary information generating unit 220, a second secondary information generating unit 230, an $L^{th}$ secondary information generating unit 240, a parameter obtaining unit 250, and a combining unit 260.

The primary information generating unit 210 may generate primary information $P_h$ that is included in an OV, based on generator information. For example, the primary information generating unit 210 may include a hash unit 212, a zero$^{th}$ pseudorandom number generating unit 214, an exclusive or (XOR) operation unit 216, and a remainder operation unit 218.

In this example, the hash unit 212 may calculate a hash value h by hashing the generator information. The zero$^{th}$ pseudorandom number generating unit 214 may generate a zero pseudorandom number $K_h$ that is to be used for generating the primary information. The zero$^{th}$ pseudorandom number generating unit 214 may generate a zero pseudorandom number $K_h$ using position information that is associated with parameters such as a pseudorandom number and seed information. The XOR operation unit 216 may generate basic information $R_h$ by performing an XOR operation with respect to the hash value h and the zero-pseudorandom number $K_h$. The remainder operation unit 218 may generate primary information $P_h$ by performing a remainder operation with respect to the basic information $R_h$, based on a predetermined value. As an example, the remainder operation unit 218 may generate the primary information $P_h$ by performing a squaring operation with respect to the basic information $R_h$, and by performing a remainder operation with respect to the squared basic information, based on the predetermined value.

In this example, each of the secondary information generating units 220, 230, and 240 includes pseudorandom number generating units 224, 234, and 244, respectively, and remainder operation units 228, 238, and 248, respectively. The secondary information generating units 220, 230, and 240 may operate in the same manner. Accordingly, an example of the first secondary information generating unit 220 may be applicable to the secondary generating units 230 and 240.

The first secondary information generating unit 220 may generate a pseudorandom number $R_1$, and generate secondary information $P_1$ that is included in OV, based on the pseudorandom number $R_1$. As described, the first secondary information generating unit 220 includes a first pseudorandom number generating unit 224 and a remainder operation unit 228.

In this example, the first pseudorandom number generating unit 224 may generate the pseudorandom number $R_1$ that is to be used for generating the secondary information $P_1$, based on parameters such as the position information that is associated with the pseudorandom number $R_1$ and seed information. The remainder operation unit 228 may generate the secondary unit $P_1$ by performing a remainder operation with respect to the pseudorandom number $R_1$, based on a predetermined value. For example, the remainder operation unit 228 may generate the secondary information $P_1$ by performing a squaring operation with respect to the pseudorandom number $R_1$ and by performing a remainder operation with respect to the squared pseudorandom number $R_1$, based on the predetermined value.

One or more of the zero$^{th}$ pseudorandom number generating unit 214, the first pseudorandom number generating unit 224, the second pseudorandom number generating unit 234, and the $L^{th}$ pseudorandom number generating unit 244 may be of the same construction or may be of different construction from each other.

The parameter obtaining unit 250 may obtain parameters that are used when the zero$^{th}$ pseudorandom number generating unit 214, the first pseudorandom number generating unit 224, the second pseudorandom number generating unit 234, and the $L^{th}$ pseudorandom number generating unit 244 generate the pseudorandom number $K_h$, the pseudorandom number $R_1$, a pseudorandom number $R_2$, and a pseudorandom number $R_L$, respectively. In this example, the obtained parameters may denote position information that is associated with the pseudorandom numbers $K_h$, $R_1$, $R_2$, and $R_L$.

As another example, the obtained parameters may include seeds that are used when the zero$^{th}$ pseudorandom number generating unit 214, the first pseudorandom number generating unit 224, the second pseudorandom number generating unit 234, and the $L^{th}$ pseudorandom number generating unit 244 generate the pseudorandom numbers $K_h$, $R_1$, $R_2$, and $R_L$, respectively.

The combining unit 260 may generate an OV that includes, for example, the primary information $P_h$, secondary information $P_1$, $P_2$, and $P_L$, and the parameters. In this example, the combining unit 260 includes concatenation operation units 262, 264, 266, and 268 that may concatenate the primary information $P_h$, the secondary information $P_1$, $P_2$, and $P_L$, and the parameters to generate the OV.

Figure 3:
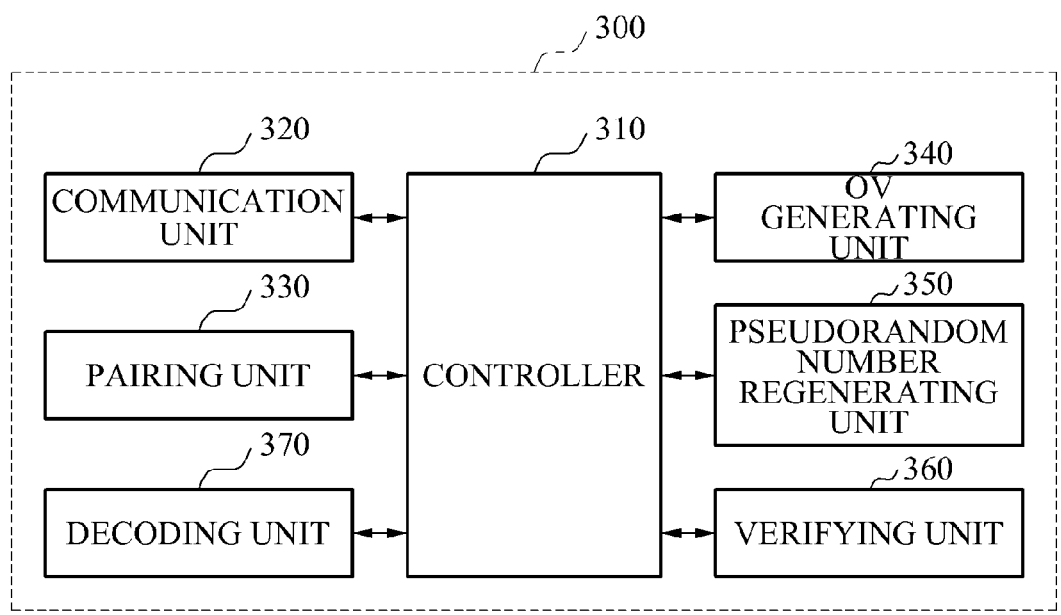
FIG. 3 is a diagram illustrating another example of an OV generating apparatus that generates and verifies an OV.

FIG. 3 illustrates another example of an OV generating apparatus that generates and verifies an OV.

Referring to FIG. 3, the OV generating apparatus 300 includes a controller 310, a communication unit 320, a pairing unit 330, an OV generating unit 340, a pseudorandom number regenerating unit 350, a verifying unit 360, and a decoding unit 370.

The communication unit 320 may transmit and receive encoded data using a secret key that is shared between devices. For example, the communication unit 320 may transmit and receive the encoded data using BLUETOOTH® communication.

The pairing unit 330 may exchange the secret key with a wireless communication target device for a wireless communication connection, via the communication unit 320. For example, the pairing unit 330 may share the secret key during a pairing, and may update pairing history information that is associated with a pairing of an OV request device.

The decoding unit 370 may receive encoded basic information from the OV request device, and may decode the encoded basic information using the secret key that is shared during the pairing, to determine the basic information.

For example, the OV request device may generate a hash value as the basic information. The hash value may be obtained by hashing updated pairing history information that is associated with the OV generating apparatus 300 and that is obtained during the pairing. The OV request device may encode the basic information with the secret key, and may transmit the encoded basic information to the OV generating apparatus 300. The OV request device may generate the basic information using generator information that is associated with a generator of the OV information generating apparatus 300. For example, the generator information may include at least one of ID information, address information, service information, and pairing history information that is associated with the OV generating apparatus 300.

The OV generating unit 340 may generate primary information that is based on the basic information that is decoded by the decoding unit 370. The OV generating unit 340 may generate at least one secondary information that is based on at least one pseudorandom number, and may obtain at least one parameter that is used when the at least one pseudorandom number is generated. The OV generating unit 340 may generate an OV that includes, for example, the primary information, the at least one secondary information, and the at least one parameter. An example of the OV generating unit 340 is described with reference to FIG. 4.

The pseudorandom number regenerating unit 350 may distribute the OV. In response to a verification request message including the OV being received, the pseudorandom number regenerating unit 350 may regenerate at least one pseudorandom number that is used when the at least one secondary information is generated using at least one parameter that is included in the OV.

The verifying unit 360 may verify the OV included in the verification request message as the OV that is generated by the OV generating apparatus 300, based on the at least one regenerated pseudorandom number.

For example, the verifying unit 360 may verify that the OV included in the verification request message is the OV that is generated by the OV generating apparatus 300, based on a zero-knowledge proof. An example of a zero-knowledge proof is described with reference to FIG. 7.

The controller 310 may control general operations of the OV generating apparatus 300. Although FIG. 3 separately illustrates the controller 310, the pairing unit 330, the OV generating unit 340, the pseudorandom number regenerating unit 350, the verifying unit 360, and the decoding unit 370, the controller 110 may perform functions of one or more of the pairing unit 330, the OV generating unit 340, the pseudorandom number regenerating unit 350, the verifying unit 360, and the decoding unit 370.

For example, the controller 310 may include at least one processor configured to perform the functions of one or more of the pairing unit 330, the OV generating unit 340, the pseudorandom number regenerating unit 350, the verifying unit 360, and/or the decoding unit 370. As another example, the controller 310 may include at least one processor configured to perform a portion of the functions of one or more of the pairing unit 330, the OV generating unit 340, the pseudorandom number regenerating unit 350, the verifying unit 360, and the decoding unit 370.

Figure 4:
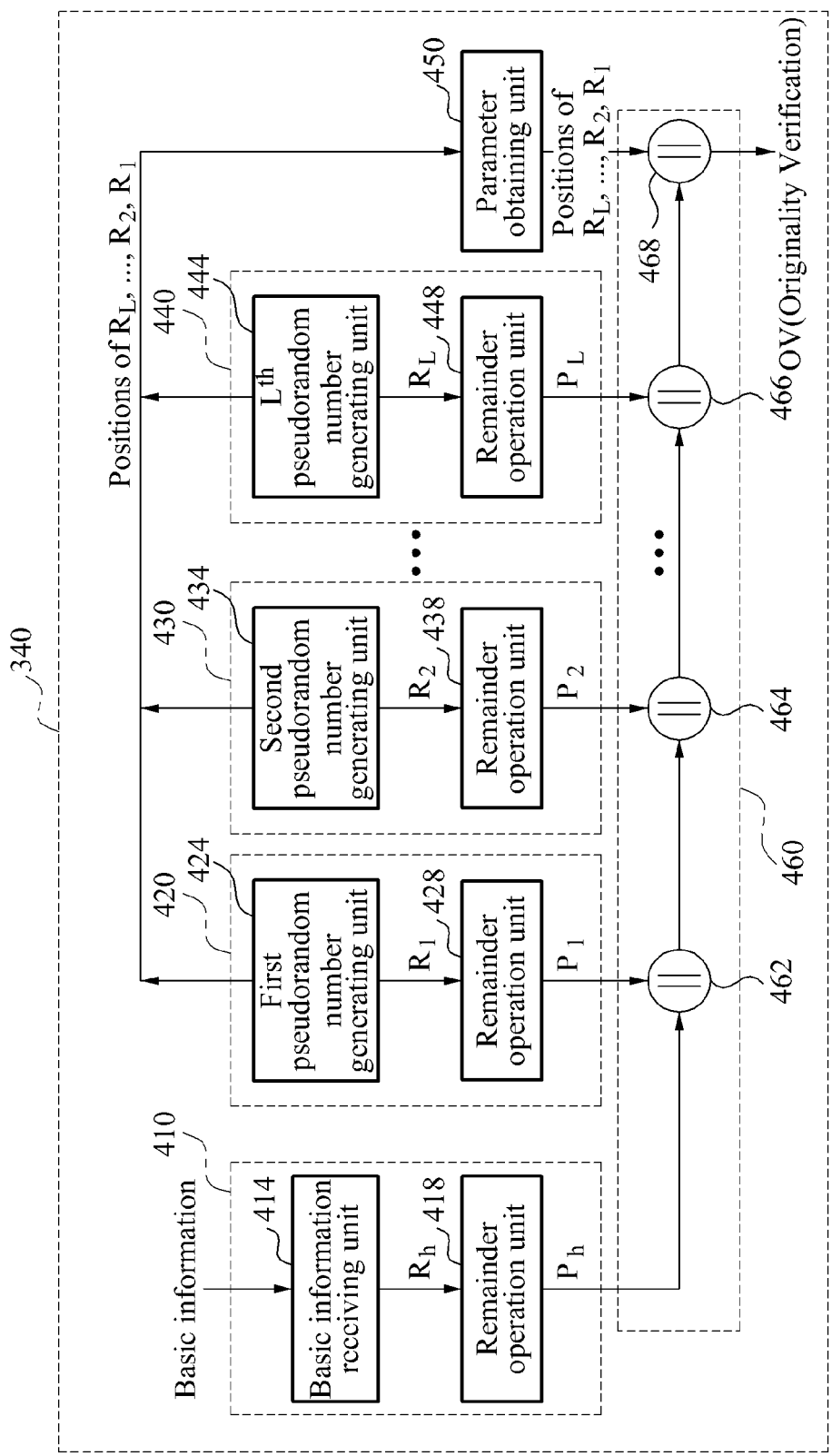
FIG. 4 is a diagram illustrating an example of the OV generating unit of FIG. 3.

FIG. 4 illustrates an example of the OV generating unit of FIG. 3. Referring to FIG. 4, the OV generating apparatus 340 includes a primary information generating unit 410, a first secondary information generating unit 420, a second secondary information generating unit 430, an $L^{th}$ secondary information generating unit 440, a parameter obtaining unit 450, and a combining unit 460.

The primary information generating unit 410 may generate primary information $P_h$ that is included in an OV, based on basic information that is received from an OV request device. In this example, the primary information generating unit 410 includes a basic information receiving unit 414 and a remainder operation unit 418.

For example, the basic information receiving unit 414 may receive decoded basic information $R_h$ that is decoded by the decoding unit 370. The remainder operation unit 418 may generate the primary information $P_h$ by performing a remainder operation with respect to the basic information $R_h$, based on a predetermined value. For example, the remainder operation unit 418 may generate the primary information $P_h$ by performing a squaring operation with respect to the basic information $R_h$ and by performing a remainder operation with respect to the squared basic information, based on the predetermined value.

Each of the secondary information generating units 420, 430, and 440 include pseudorandom number generating units 424, 434, and 444, respectively, and remainder operation units 428, 438, and 448, respectively. The secondary information generating units 420, 430, and 440 may operate in the same manner. Accordingly, an example of the first secondary information generating unit 420 may be applicable to the secondary information generating units 430 and 440.

The first secondary information generating unit 420 may generate a pseudorandom number $R_1$, and may generate secondary information $P_1$ that is included in the OV, based on the pseudorandom number $R_1$. In this example, the first secondary information generating unit 420 includes a first pseudorandom number generating unit 424 and a remainder operation unit 428.

In this example, the first pseudorandom number generating unit 424 may generate the pseudorandom number $R_1$ to be used to generate the secondary information $P_1$, based on parameters such as the position information that is associated with the pseudorandom number $R_1$ and seed information. The remainder operation unit 428 may generate the secondary unit $P_1$ by performing a remainder operation with respect to the pseudorandom number $R_1$, based on a predetermined value. For example, the remainder operation unit 428 may generate the secondary information $P_1$ by performing a squaring operation with respect to the pseudorandom number $R_1$ and by performing a remainder operation with respect to the squared pseudorandom number $R_1$, based on the predetermined value.

The first pseudorandom number generating unit 424, the first pseudorandom number generating unit 434, and the $L^{th}$ pseudorandom number generating unit 444 may be of the same construction or one or more may be of different from each other.

The parameter obtaining unit 450 may obtain parameters that are used when the first pseudorandom number generating unit 424, the second pseudorandom number generating unit 434, and the $L^{th}$ pseudorandom number generating unit 444 generate the pseudorandom number $R_1$, a pseudorandom number $R_2$, and a pseudorandom number $R_L$, respectively. In this example, the obtained parameters may denote position information that is associated with the pseudorandom numbers $R_1$, $R_2$, and $R_L$. The obtained parameters may include seeds that are used when the first pseudorandom number generating unit 424, the second pseudorandom number generating unit 434, and the $L^{th}$ pseudorandom number generating unit 444 generate the pseudorandom numbers $R_1$, $R_2$, and $R_L$, respectively.

The combining unit 460 may generate the OV including the primary information $P_h$, the secondary information $P_1$, $P_2$, and $P_L$, and parameters. In this example, the combining unit 460 includes concatenation operation units 462, 464, 466, and 468, and may concatenate the primary information $P_h$, the secondary information $P_1$, $P_2$, and $P_L$, and the parameters to generate the OV.

Figure 5:
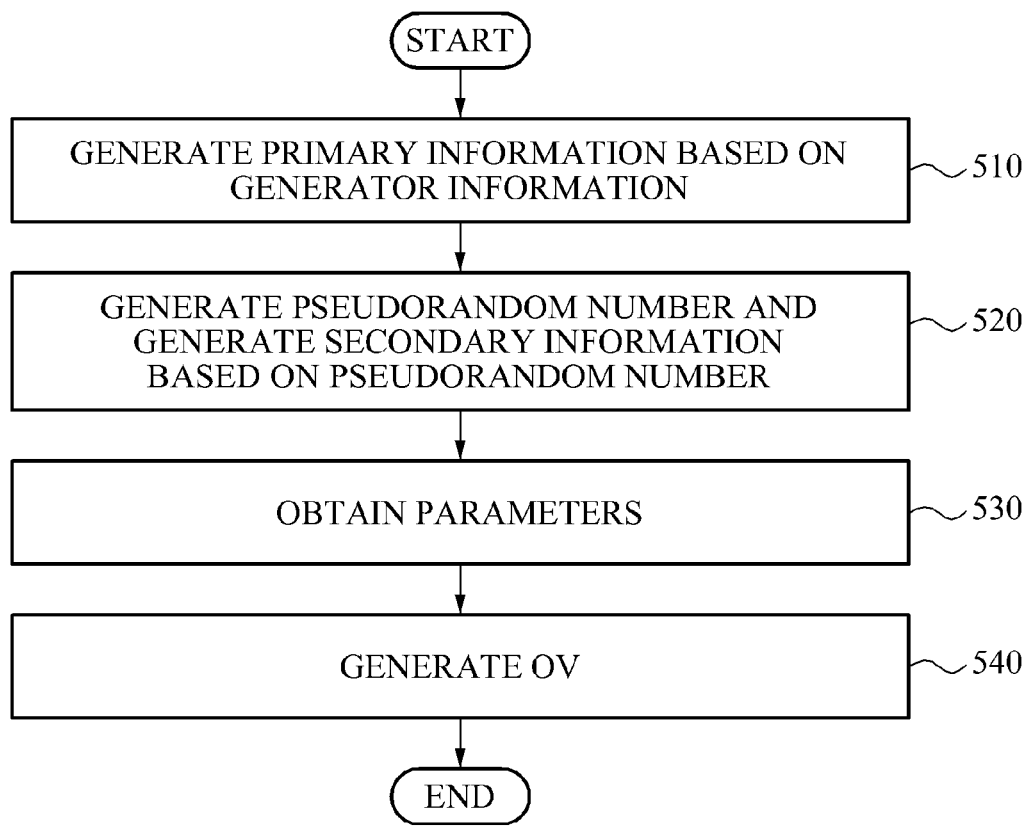
FIG. 5 is a flowchart illustrating an example of a method that generates an OV in an OV generating apparatus.

FIG. 5 illustrates an example of a method that generates an OV in an OV generating apparatus.

Referring to FIG. 5, in 510 the OV generating apparatus generates primary information that is included in the OV, based on generator information that is associated with a generator of the OV generating apparatus. For example, a hash value may be generated by hashing the generator information, a zero pseudorandom number may be generated, and basic information may be generated by performing an XOR operation with respect to the hash value and the zero pseudorandom number. The primary information may be generated by performing a remainder operation with respect to the basic information that is based on a predetermined value.

Encoded basic information may be received from the OV request device, and the encoded basic information may be decoded to determine the basic information based on a secret key that is shared during a pairing. In this example, the primary information may be generated by performing a remainder operation with respect to the basic information based on the predetermined value.

In 520, the OV generating apparatus generates at least one pseudorandom number and generates at least one secondary information by performing a remainder operation with respect to the at least one pseudorandom number, based on the predetermined value.

In 530, the OV generating apparatus obtains parameters that are used when the primary information and the at least one secondary information are generated.

In 540, the OV generating apparatus generates the OV including the primary information, the at least one secondary information, and the parameters.

Figure 6:
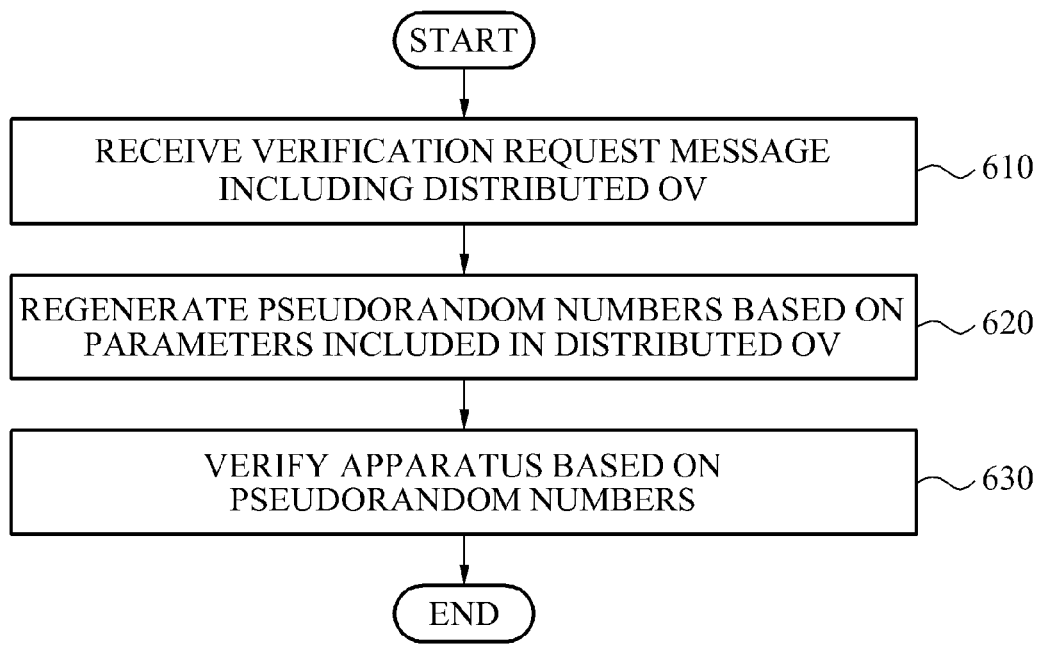
FIG. 6 is a flowchart illustrating an example of a method that verifies an OV that is distributed from an OV generating apparatus.

FIG. 6 illustrates an example of a method that verifies that the OV is distributed from the OV generating apparatus.

Referring to FIG. 6, the OV generating apparatus receives a verification request message including the OV that is distributed from an OV request device, in 610.

The OV generating apparatus regenerates at least one pseudorandom number using at least one parameter that is included in the distributed OV, in 620. For example, a parameter may denote position information that is associated with a pseudorandom number. Only the OV generating apparatus may be aware of seeds and a pseudorandom number generating units corresponding to the parameters. Accordingly, the pseudorandom numbers that are used when the primary information and the secondary information are generated may be regenerated in the OV generating apparatus.

In 630, the OV generating apparatus verifies that the OV generating apparatus is the apparatus that generates the distributed OV. In this example, the OV generating apparatus may verify that the OV included in the verification request message is the OV generated by the OV generating apparatus, based on a zero-knowledge proof.

FIG. 7 illustrates an example of a zero-knowledge proof process that verifies an OV generating apparatus as an apparatus that distributes OV.

Referring to FIG. 7, an OV request device 700 transmits a zero-knowledge proof (ZKP) request message for the zero-knowledge proof, to an OV generating apparatus 100, in 702.

The OV request device 700 and the OV generating apparatus 100 transmit and receive verification messages for verification, in 704. For example, the verification messages for the verification may include ZKP AnswerX, ZKP Query, and ZKP AnswerY. In this example, 704 is for first verification, and thus, ZKP AnswerX, ZKP Query, and ZKP AnswerY for the first verification may be denoted by ZKP AnswerX1, ZKP Query1, and ZKP AnswerY1, respectively.

For example, ZKP AnswerX, ZKP Query, and ZKP AnswerY may be generated based on Equation 1.

AnswerX=x $x=r^2$ mod N(Rand. # r by RNG)

Query=Randomly selected $A_L, \ldots, A_2, A_1, A_h \in \{0,1\}$

AnswerY=y $y = rR_L^{A_L} \ldots R_2^{A_2} R_1^{A_1} R_h^{A_h} \bmod N$ [Equation 1]

Referring to Equation 1, for example, ZKP Query may be generated by randomly generating '0' or '1'. In this example, r denotes a pseudorandom number newly generated for ZKP Answer, $R_L, \ldots, R_2, R_1$, and $R_h$ denote pseudorandom numbers that are used when primary information and secondary information are generated as illustrated in FIG. 2, N denotes a predetermined value for performing a remainder operation, $A_L, \ldots, A_2, A_1$, and $A_h$ denote a value of ZKP Query, and $R_L^{A_L}$ denotes a value obtained by raising $R_L$ to the $A_L^{th}$ power.

In 704, when the ZKP request message is received, the OV generating apparatus 100 transmits ZKP AnswerX1 to the OV request device 700. The OV request device 700 transmits ZKP Query1 that is a first query, to the OV generating apparatus 100. In response to receiving the ZKP Query1, the OV generating apparatus 100 generates ZKP AnswerY1 that is an answer in response to ZKP Query1. For example, the OV generating apparatus 100 may encode ZKP AnswerY1 with a public key $PK_R$ of the OV request device 700 by concatenating a secret key to be shared with the OV request device 700, and may transmit the encoded ZKP AnswerY1 to OV request device 700.

In response to receiving encoded ZKP AnswerY1, the OV request device 700 may decode the encoded ZKP AnswerY1 using a signature key $SK_R$, and may verify ZKP AnswerY1, in 706. In this example, the verification of ZKP AnswerY1 may be performed as expressed by Equation 2.

$$y^2 = xP_L^{A_L} \ldots P_2^{A_2} P_1^{A_1} P_h^{A_h} \bmod N \Rightarrow \text{True}$$

$$y^2 \ne xP_L^{A_L} \ldots P_2^{A_2} P_1^{A_1} P_h^{A_h} \bmod N \Rightarrow \text{False}$$

In Equation 2, x denotes a value of ZKP AnswerX, and y denotes a value of ZKP AnswerY. Also in this example, $P_L, \ldots, P_2, P_1$, and $P_h$ denote primary information and secondary information included in the OV as illustrated in FIG. 2, $A_L, \ldots, A_2, A_1$, and $A_h$ denote a value of ZKP Query, and $P_L^{A_L}$ denotes a value obtained by raising $P_L$ to $A_L^{th}$ power.

The OV request device 700 may terminate an algorithm when the verification fails in verifying ZKP AnswerY1, in 706. In this example, after performing the first verification, the OV request device 700 and the OV generating apparatus may perform additional verifications, for example, one additional verification, two additional verifications, three additional verifications, or more additional verifications.

In this example, in response to the verification succeeding in verifying ZKP AnswerY1 in 706, the OV request device 700 performs, with the OV generating apparatus 100, transmission and reception of verification messages for a second verification, in 708.

After performing the second verification 708, the OV request device 700 and the OV generating apparatus perform verifications 712 and 716.

After operations 704, 708, 712, and 716 in which the messages used for verification are transmitted and received, operations 706, 710, 714, and 718 in which verification is performed are performed, and when all operations 706, 710, 714, and 718 succeed in the verification, the distributed OV is verified as the OV generated by the OV generating apparatus 100.

As the number of operations for verification increase, such as operations 706, 710, 714, and 718, a reliability of the zero-knowledge proof may also increase.

Various aspects are directed towards an apparatus and method that may generate and distribute an OV, and may verify that an OV generating apparatus is the apparatus that generates the OV based on the distributed OV. The apparatus and method may be used in a network environment that has a low accessibility, because the OV is distributed and the OV generating apparatus that generates the OV is verified. A secret key may be shared during the verification of the OV and thus, a length of the secret key may not be limited.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating and verifying an originality verification (OV), the apparatus comprising:
    a receiver to receive a verification request message including an OV;
    a primary information generating unit to generate primary information based on generator information that is associated with the apparatus and a first pseudorandom number;
    at least one secondary information generating unit to generate secondary information by generating and using a second pseudorandom number;
    a parameter obtaining unit to obtain at least one parameter from the OV used to generate the first and second pseudorandom numbers;
    a combining unit to combine the primary information, the secondary information, and the at least one parameter to generate an OV; and
    a verifying unit to verify that the OV generated by the apparatus is the same as the OV included in the verification request message.

2. The apparatus of claim 1, wherein the generator information includes at least one of identification (ID) information of the apparatus, address information of the apparatus, service information of the apparatus, and pairing history information of the apparatus.

3. The apparatus of claim 1, wherein the primary information generating unit comprises:
a hash unit to calculate a hash value by hashing the generator information;
a zero$^{th}$ pseudorandom number generating unit to generate a zero pseudorandom number to be used for generating the primary information;
an exclusive or (XOR) operation unit to generate basic information by performing an XOR operation using the hash value and the zero-pseudorandom number; and
a remainder operation unit to generate the primary information by performing a remainder operation based on a predetermined value using the basic information.

4. The apparatus of claim 3, wherein the parameter obtaining unit obtains a parameter that is used when the zero-pseudorandom number is generated.

5. The apparatus of claim 3, wherein the remainder operation unit generates the primary information by performing a squaring operation using the basic information and by performing a remainder operation based on a predetermined value using the squared basic information.

6. The apparatus of claim 1, wherein each secondary information generating unit comprises:
a pseudorandom number generating unit to generate a pseudorandom number to be used for generating secondary information; and
a remainder operation unit to generate the secondary information by performing a remainder operation based on a predetermined value using the pseudorandom number.

7. The apparatus of claim 1, wherein the at least one parameter is position information associated with the pseudorandom number and seed information.

8. The apparatus of claim 6, wherein the remainder operation unit generates the secondary information by performing a squaring operation using the pseudorandom number and by performing a remainder operation based on a predetermined value using the squared pseudorandom number.

9. The apparatus of claim 1, wherein the combining unit generates the OV by concatenating the primary information, the secondary information, and the at least one parameter.

10. The apparatus of claim 1, further comprising:
a pseudorandom number regenerating unit to regenerate a pseudorandom number using the at least one parameter included in the OV, in response to a verification request message including the OV being received after the OV is distributed,
wherein the verifying unit verifies that the apparatus generates the same OV as the OV included in the verification request message, using the regenerated pseudorandom number.

11. The apparatus of claim 10, wherein:
the pseudorandom number regenerating unit regenerates a zero pseudorandom number when a parameter of the zero pseudorandom number exists in the OV; and
the verifying unit verifies the apparatus generates the same OV as the OV included in the verification request message, using the zero pseudorandom number and the regenerated pseudorandom number.

12. The apparatus of claim 1, wherein the verifying unit verifies the apparatus generates the same OV as the OV included in the verification request message based on a zero-knowledge proof.

13. The apparatus of claim 1, further comprising:
a pairing unit to connect communication by pairing the apparatus with an OV request device, to share a secret key while performing the pairing, and to update pairing history information that is associated with the pairing of the OV request device; and
a decoder to receive, from the OV request device, encoded basic information, and to decode the encoded basic information based on the secret key, to determine the basic information,
wherein the primary information generating unit comprises a basic information receiving unit to receive the basic information, and a remainder operation unit to generate the primary information by performing a remainder operation based on a predetermined value using the basic information.

14. The apparatus of claim 13, wherein the basic information is a hash value that is obtained by hashing one of the updated pairing history information and the generator information.

15. The apparatus of claim 1, wherein the at least one secondary information generating unit comprises a plurality of a secondary information generating units that each generate a plurality of secondary information by generating and using a plurality of pseudorandom numbers, respectively, and
wherein the parameter obtaining unit obtains at least one parameter used when each respective pseudorandom number is generated, and the combining unit generates the OV by combining the primary information, the plurality of secondary information, and the at least one parameter corresponding to each respective pseudorandom number.

16. The apparatus of claim 15, wherein the at least one parameter is position information associated with each respective pseudorandom number and seed information associated with each respective pseudorandom number.

17. A method of generating and verifying an originality verification (OV) using an OV generating apparatus, the method comprising:
receiving a verification request message including the distributed OV;
generating, by a processor, primary information based on generator information about the OV generating apparatus and a first pseudorandom number;
generating at least one secondary information by generating and using a second pseudorandom number;
obtaining at least one parameter from the OV used to generate the first and second pseudorandom numbers;
combining the primary information, the secondary information, and the at least one parameter to generate an OV; and
verifying that the OV generated by the OV generating apparatus is the same as the OV included in the verification request message.

18. The method of claim 17, wherein the generating comprises:
calculating a hash value by hashing the generator information;
generating a zero pseudorandom number to be used for generating the primary information;
generating basic information by performing an exclusive or (XOR) operation using the hash value and the zero-pseudorandom number; and
generating the primary information by performing a remainder operation based on a predetermined value using the basic information.

19. The method of claim 17, wherein the generating of the secondary information comprises:
 generating the second pseudorandom number to be used for generating the secondary information; and
 generating the secondary information by performing a remainder operation based on a predetermined value using the second pseudorandom number.

20. The method of claim 17, further comprising:
 connecting communication by pairing the OV generating apparatus with an OV request device, sharing a secret key while performing the pairing, and updating pairing history information that is associated with the pairing of the OV request device; and
 receiving, from the OV request device, encoded basic information, and decoding the encoded basic information to determine the basic information, based on the secret key,
 wherein the generating of the primary information comprises generating the primary information by performing a remainder operation based on a predetermined value using the basic information.

21. A method of an apparatus for verifying a distributed original verification (OV), the method comprising:
 receiving a verification request message including the distributed OV;
 generating, by a processor, primary information based on information about the apparatus and a first pseudorandom number;
 generating secondary information based on a second pseudorandom number;
 obtaining at least one parameter from the OV that is used to generate the first and second pseudorandom numbers;
 combining the primary information, the secondary information, and the at least one parameter to generate an OV; and
 verifying that the OV generated by the apparatus is the same as the OV included in the verification request message.

22. The method of claim 21, wherein the verifying comprises verifying the OV generating apparatus is the apparatus that generates the distributed OV, based on a zero-knowledge proof.

* * * * *